United States Patent [19]

Moss

[11] 4,255,162

[45] Mar. 10, 1981

[54] INTEGRATED PROCESS FOR CONVERTING SULFUR-CONTAINING FUELS TO LOW SULFUR COMBUSTIBLE GAS

[75] Inventor: Gerald Moss, Wantage, England

[73] Assignee: Exxon Research and Engineering Co., Florham Park, N.J.

[21] Appl. No.: 61,368

[22] Filed: Jul. 27, 1979

Related U.S. Application Data

[63] Continuation-in-part of Ser. No. 962,224, Nov. 20, 1978, abandoned, which is a continuation of Ser. No. 505,365, Sep. 12, 1974, abandoned, which is a continuation of Ser. No. 249,713, May 1, 1972, abandoned, which is a continuation of Ser. No. 734,816, Jun. 5, 1968, abandoned.

[30] Foreign Application Priority Data

Jun. 7, 1967 [GB] United Kingdom ............... 38447/66
Feb. 27, 1968 [GB] United Kingdom ................. 9533/68

[51] Int. Cl.$^3$ .............................................. C10K 3/54
[52] U.S. Cl. .................................. 48/197 R; 48/212; 208/226; 208/250; 423/244; 423/561 R; 423/563; 423/638; 423/539
[58] Field of Search ............... 423/178, 210, 220, 224, 423/230, 242 A, 244 A, 231, 561, 563, 564, 574, 576, 578, 539; 208/250, 226; 48/197, 128, 212; 431/144

[56] References Cited

U.S. PATENT DOCUMENTS

| | | | |
|---|---|---|---|
| 1,244,280 | 10/1917 | Bassett | 423/638 |
| 3,402,998 | 9/1968 | Squires | 423/563 |
| 3,807,090 | 4/1974 | Moss | 208/226 X |

*Primary Examiner*—Earl C. Thomas
*Attorney, Agent, or Firm*—Marthe L. Gibbons

[57] ABSTRACT

Sulfur-containing fuels are converted to substantially sulfur-free combustible gas in an integrated process involving part combustion in a dense phase fluidized conversion bed of particles comprising alkaline earth metal oxides. An oxygen-containing gas is passed into the base of the bed to maintain a relatively high fuel/air ratio. Sulfur is chemically fixed in the particles by reaction to form alkaline earth metal sulfide. Particles containing alkaline earth metal sulfide are circulated from one region of the conversion bed to one region of a dense phase fluidized regeneration bed operated at a higher temperature and fluidized by passing into the base thereof an oxygen-containing gas which exothermically regenerates chemically active alkaline earth metal oxide from the sulfide liberating gases which have a low oxygen content and a relatively high content of sulfur moieties (e.g. $SO_2$). Hot particles are circulated from a second region of the regeneration bed to a second region of the conversion bed for use in fixing further quantities of sulfur from sulfur-containing fuel. Both beds contain a high molar proportion of unreacted alkaline earth metal oxide thereby imparting high sulfur-retaining capability to the conversion bed, and the beds interact cooperatively with each other at least in that particles entering the regeneration bed moderate temperatures therein and particles entering the conversion bed add heat thereto thereby reducing the fuel requirement for maintaining the conversion bed temperature.

9 Claims, 1 Drawing Figure

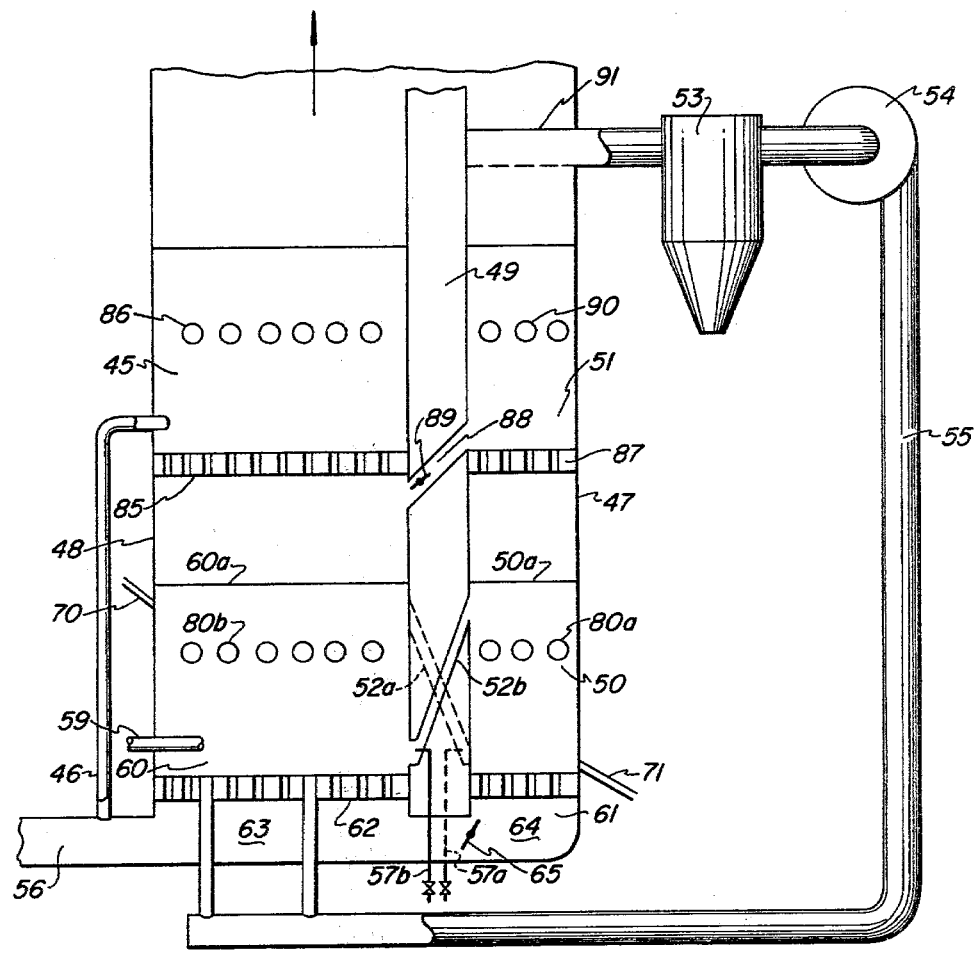

INTEGRATED PROCESS FOR CONVERTING SULFUR-CONTAINING FUELS TO LOW SULFUR COMBUSTIBLE GAS

This application is a continuation-in-part of Application Ser. No. 962,224, filed Nov. 20, 1978, now abandoned, which is continuation of Application Ser. No. 505,365, filed Sep. 12, 1974, now abandoned, which is a continuation of Application Ser. No. 249,713, filed May 1, 1972, now abandoned, which is a continuation of application Ser. No. 734,816, filed June 5, 1968, now abandoned.

The present invention relates to an integrated process for converting a sulfur-containing fuel to a substantially sulfur-free combustible gas. The sulfur-containing fuel may be solid (e.g. coal, which may contain ash), liquid or gaseous, and in most instances will be a hydrocarbon or hydrocarbonaceous fuel.

BACKGROUND OF THE INVENTION

Most fuels, e.g. fuel oils or coals or gaseous fuels (e.g. natural gas or gases produced in gasifiers) generally contain sulfur and/or sulfur compounds hereinafter referred to generally in this specification and appendant claims as sulfur, and also other undesirable substances such as, e.g. vanadium and sodium which give rise to corrosion problems and also pollute the atmosphere. To deal with these problems, several approaches have been proposed, namely:

(1) purifying the fuels before use to remove the undesirable substances;
(2) purifying the fuels during combustion;
(3) purifying the gaseous products of the fuel combustion; and
(4) combinations of (1) to (3).

Proposal (1) has the drawback of being expensive in practice, as also does proposal (3).

Proposal (2) is less expensive than proposals (1) and (3) in principle, but in practice, the operating cost and fuel consumption are relatively high and susceptible of considerable improvement. U.S. patent specification 3,402,998 of A. M. Squires exemplifies one proposal for purifying fuel during part-combustion and for purifying the resulting gases (i.e. proposals (2) and (3)) but wherein the fuel consumption is excessive for the fuel which is part-combusted as a result of the operating cycle. In U.S. Pat. No. 3,402,998, a sulfur-containing fuel oil is partially combusted within the dense phase of a fluidized bed of particles comprising calcined dolomite at temperatures below the range of temperatures at which chemical deactivation of the calcined dolomite occurs and at a pressure of between 4 and 100 atmospheres, and preferably at about 550 psia. The bed is fluidized by passing an oxygen-containing gas into the bottom thereof and sulfur from the fuel is fixed by chemical combination with the calcined dolomite to form sulfurized dolomite (MgO.CaS), the fuel being converted to a substantially sulfur-free combustible gas at about 550 psia. The rate at which the oxygen-containing gas is passed into the bottom of the fluidized bed is sufficient to entrain out of the bed for dilute phase transport sufficient solids to provide adequate time of contact between the fuel and combustible gas products and the sulfur-fixing solids for an acceptable degree of sulfur-fixing in the solids and to maintain the proportion of unreacted calcined dolomite at a sufficiently high level to maintain the sulfur-fixing ability of the fluidized bed. The sulfurizied solids are separated from the substantially sulfur-free combustible gas by a cyclone separator system and treated with $CO_2$ to convert nonsulfurized CaO to $CaCO_3$, and with steam to convert CaS to $H_2S$ by the endothermic reaction:

$$CaS + H_2O \rightarrow CaO + H_2S.$$

The foregoing treatments are conducted under non-oxidizing conditions, preferably reducing conditions, to avoid converting the CaS to $CaSO_4$.

The resulting solids mixture of $MgO.CaCO_3$ and MgO.CaO is returned to the dense phase fluidized bed for further use in fixing sulfur from sulfur-containing fuel. Optionally, the said solids mixture is calcined, preferably under non-oxidizing conditions, to convert to $CaCO_3$ to CaO before the solids enter the fluidized bed. The process of U.S. Pat. No. 3,402,998 is relatively inefficient for the following reasons:

(a) the amount of oxygen-containing gas passed into the base of fluidized part-combustion bed must be sufficient to entrain solids out of the bed at a rate which depends on the amount of sulfur fixed in the solids from the fuel and the resulting gas products. As a consequence, the amount of heat removed from the bed in the combustible gas containing entrained solids must be balanced by burning in the bed sufficient additional fuel to compensate for the heat loss from the bed.

(b) the amount of solids removed by entrainment from the part-combustion bed is a function of the flow of gases through the bed rather than a function of the amount of sulfur fixed in the bed. As a consequence, the sulfur-fixing solids of the bed are not efficiently utilized.

(c) the reactions for removing sulfur fixed in the bed solids must be performed under suitable conditions for carbonating untreated CaO with $CO_2$, which means that the pressure must be higher and/or the temperature lower during this operation than the pressure and/or temperature during the sulfur-fixing operation. In practice, the process of U.S. Pat. No. 3,402,998 is operated substantially isobarically and as a consequence, the sulfur-removing reactions must be performed at considerably lower temperatures than the sulfur-fixing reactions. Moreover, the reaction of CaS with steam is endothermic. Thus, a great deal of the heat produced by part-combustion in the fuel must be utilized to raise the temperature of recycled solids, following $CO_2$ and steam treatment, to the fuel conversion temperature, so that the efficiency of fuel utilization is still further reduced.

Although the process of U.S. Pat. No. 3,402,998 is represented to be, and might appear to be, an integrated process in the sense that the process steps in one part of the process scheme operate in a cooperative manner with process steps in another part of the scheme, in fact the steps concerned with removing fixed sulfur from the sulfurized dolomite operate independently of the steps in which the sulfur of the fuel is chemically fixed in the dolomite solids.

It has been proposed in U.S. patent specification No. 1,244,280 (Basset) to reduce $CaSO_4$ by passing particulate $CaSO_4$ material down a rotating kiln having an upstream reducing zone wherein most of the $CaSO_4$ is progressively reduced to CaS as it passes through the reducing zone, and the resulting solids then pass through an oxidizing zone wherein the following reactions occur progressively:

$$2CaS + 3O_2 \rightarrow 2CaO + 2SO_2 \quad (1)$$

$$CaS + 2O_2 \rightarrow CaCO_4 \quad (2)$$

$$3CaSO_4 + CaS \rightarrow 4CaO + 4SO_2 \quad (3)$$

According to U.S. Pat. No. 1,244,280, the complete decomposition of $CaSO_4$ is obtained by (reaction with) an excess of CaS (equation (3) above), and the remaining CaS is then oxidized to CaO using an excess of air.

It has been said that the reactions which occur in a fluidized bed reaction system are equivalent to those in a non-fluidized reaction system. This may be the case in some instances, but in the case of the process of U.S. Pat. No. 1,244,280 which takes place in a rotating kiln, the nature and reacting solids and gases in contact therewith varies from position to position in the kiln. Thus the solids entering the oxidizing zone are rich in CaS and at a relatively low temperature, whereas the gases in contact therewith are relatively depleted in oxygen, rich in $SO_2$ and very hot. The solids approaching the exit of the oxidizing zone are very hot and the gases in that region are rich in oxygen and cool. It has been found that the mol. ratios of oxygen, $SO_2$ and CaS and the temperature of contact are very influential in determining which of reactions (1), (2) and (3) predominates. When the temperature is above 1050° C. at atmospheric pressure, a low mol. ratio of $O_2$ to CaS causes reaction (1) to predominate provided that the partial pressure of $SO_2$ is not so high that reaction is not possible. No temperatures are given in U.S. Pat. No. 1,244,280 but it seems likely that at the entrance to the oxidizing zone, the solids temperature will be too low for much reaction to occur.

As the solids progress down the kiln, they will heat up and pass through a region where the mol. ratios of $O_2$, $SO_2$ and CaS and the temperatures thereof will be correct for reaction (1) to predominate. Reaction (1) is highly exothermic, and the solids passing towards the exit will become progressively hotter while the $O_2$ to CaS ratio will increase, and the air temperature diminish. It is known that at high $O_2$ to CaS ratios below 1050° C. reaction (2) predominates. Now although reaction (2) is even more highly exothermic than reaction (1), the amount of heat-producing solid will be diminished towards the exit of the oxidizing zone and the amount of air capable of removing the heat will tend to be relatively so great that a significant proportion of the CaS will be converted to $CaSO_4$ in the product. Moreover, the product solids will be cooled virtually to ambient air temperatures. Thus, the process of U.S. Pat. No. 1,244,280, particularly where it involves the countercurrent contacting of cool air and hot CaS material, produces a hot gas removing virtually all the heat content of the solids and containing $SO_2$ and unused $O_2$, and a cool solid containing CaO and $CaSO_4$.

Theoretically one might substitute the oxidizing part of the rotary kiln of U.S. Pat. No. 1,244,280 for the $CO_2$ and steam treating steps of U.S. Pat. No. 3,402,998 as has been suggested at a date later than the claimed priority date of the present patent application, but the thermal efficiency of the thus theoretically modified process of U.S. Pat. No. 3,402,998 would be very low because the solids leaving the kiln and entering the fluidized fuel conversion bed would require heating to the temperature of the latter and additional combustion of fuel would be required to provide the heat to raise the temperature of the solids. Alternatively, it is possible, in theory, that the solids could have a higher concentration of unconverted CaS at a temperature approximating to that of the fluidized fuel conversion bed. However, this would have the drawback of circulating a relatively large inventory of CaS from the fuel conversion bed to the rotary kiln and then back to the bed. Such circulation is undesirable in principle, and would, in practice, reduce the efficiency of fixing the sulfur from the fuel in the bed solids and necessitate the use of increased quantities of gas to effect the dilute phase transfer of the solids from the fluidized fuel conversion bed to the top end of the rotary kiln. All of the foregoing ignores the considerable practical difficulties of constructing a rotary kiln to operate at the high pressures of the process of U.S. Pat. No. 3,402,998.

SUMMARY OF THE INVENTION

The foregoing drawbacks of notional combinations of prior art processes are avoided by the present invention.

The present invention provides an integrated process for converting a sulfur-containing fuel to a substantially sulfur-free combustible gas in which the fuel is partially combusted within a sulfur-fixing dense-phase fluidized fuel conversion bed operated at a fuel conversion temperature so that the fuel is converted to a substantially sulfur-free combustible gas which is discharged from above the top of the conversion bed and wherein sulfur from the fuel is fixed, by chemical reaction in particles of the conversion bed, and in which particles are transferred from a first region of the conversion bed to a first region of a dense-phase fluidized regeneration bed operated at regeneration conditions including a regulated regeneration temperature exceeding the fuel conversion temperature so that at least some of the sulfur which is chemically fixed in the particles is released as gas phase sulfur moieties which are discharged from above the top of the said regeneration bed, and transferring particles from a second region of the regeneration bed, spaced-apart from the first region thereof, to a second region of the fuel conversion bed spaced-apart from the first region thereof, wherein the conversion bed is comprised of particles including alkaline earth metal oxide which fixes sulfur from the fuel by forming alkaline earth metal sulfide, and the conversion bed is fluidized by passing into the bottom thereof an oxygen-containing gas, and wherein the regeneration bed is fluidized by passing into the bottom thereof an oxygen-containing gas whereby at least some alkaline earth metal sulfide from the fuel conversion bed is converted to alkaline earth metal oxide with the evolution of sulfur oxide(s) and the liberation of heat tending to raise the temperature of the regeneration bed towards a deactivating temperature range, regulating the rate of transfer of particles from the fuel conversion bed at the conversion bed temperature to the regeneration bed so as to effect at least partial regulation of the temperature in the regeneration bed in a range not exceeding a predetermined maximum regeneration bed temperature below said deactivating temperature range, regulating the rate of supply of oxygen-containing gas to the regeneration bed to be such that:

(a) sulfur is liberated therefrom as sulfur moieties, including sulfur oxide(s) at substantially the same rate as sulfur from the fuel is fixed in the fuel conversion bed; but (b) insufficient to reduce the temperature of the regeneration bed to that of the fuel conversion bed; and employing the heat content of the particles transferred from the second region of the regeneration bed to the second region of the fuel conversion bed to provide some of the heat required for maintaining the conversion temperature of the fuel conversion bed whereby a reduced amount of fuel is required to maintain the temperature of the fuel conversion bed and an increased proportion of the fuel is converted to substantially sulfur-free combustible gases.

The regeneration of alkaline earth metal sulfide material to the corresponding oxide is effected in the fluidized regeneration bed. For most purposes, a fluidized bed can be regarded as substantially homogenous as regards its solids compositions and temperatures, although this is a simplification. Similarly, the gases in a fluidized bed can be regarded, for simplicity, as being in thermal equilibrium with the solids in the bed, and therefore there will not be any significant thermal gradients within the bed. The solids in the bed circulate upwardly and correspondingly downwardly at a much greater rate than they circulate laterally. Accordingly, a particle containing alkaline earth metal sulfide within the fluidized bed will be rapidly brought to the temperature of the bed, which (in contrast to the situation in a rotary kiln) is a substantially uniform temperature. When the particle circulates downwardly, it may pass near to the bottom of the fluidized bed where the partial pressure of oxygen is relatively high. At high $O_2/CaS$ mol. ratios, as mentioned above, the predominating reaction will depend on the temperature of the gas and solid. Near the bottom of the regeneration bed (e.g. no more than 5 cms from the bottom thereof) the partial pressure of oxygen will be relatively high, and the temperatures of the particle and gas will be roughly the same. Accordingly, both reactions (1) and (2) may be expected. When the particle subsequently circulates upwardly in the regeneration bed where the partial pressure of oxygen is relatively low, some unconverted CaS will be converted according to reaction (1), and some $CaSO_4$ formed by reaction (2) will react with other unconverted CaS according to reaction (3). The repeated upward and downward circulation of the particle in the manner described causes most of the CaS in the particle on entering the regeneration bed to be converted to CaO with the liberation of $SO_2$ and the evolution of heat which maintains the regeneration bed at the regeneration temperature. The repeated exposure of CaS-containing particles to atmospheres of low and high oxygen tension at substantially uniform temperatures is not possible in, e.g. a rotary kiln or packed bed or other type of reactor, and in this invention provides benefits which would not otherwise be realizable. The benefits are: the regeneration of most of the CaS to CaO; the regeneration at virtually optimum regeneration temperatures which are neither so low that the regeneration proceeds slowly nor so high that the reactivity of the regenerated CaO is substantially affected; optimum or near optimum usage of the oxygen which is passed into the regeneration bed so that the gases leaving the top of the regeneration bed are substantially free of oxygen and contain $SO_2$ in a high concentration. The particles entering the regeneration bed are at the lower fuel conversion temperature and play a part in maintaining the regeneration bed temperature below the temperature range at which the chemical reactivity of the CaO is adversely affected. Similarly, the particles entering the conversion bed from the regeneration bed are at the higher temperature of the latter and play a part in maintaining the fuel conversion temperature so than an increased proportion of the fuel passed into the fuel conversion bed is converted to combustible gases, since less needs to be consumed merely to maintain the fuel conversion bed temperature.

The transfer of particles from one bed to the other may be effected substantially independently of the rate at which oxygen-containing gas is passed into the bottom of a respective bed. Such transfer may be effected by any of the known means available, e.g. intermittent pneumatic dense phase conveyors, dilute and dense phase transfer line conveyors of the types employed in catalytic cracking units, screen conveyors, belt conveyors, etc.

Preferably, the alkaline earth metal oxide is present in the bed in a stoichiometric excess relative to the amount of sulfur fixed in the bed. It is preferred that the fuel conversion bed contains at least 90 mol. % of the reactive alkaline earth metal as the oxide (e.g. CaO) and no more than 10 mol. % as the sulfide. In the presence of this excess of reactive alkaline earth metal oxide, the fuel conversion bed is very efficient for sulfur-fixing. The particles transferred to the regeneration bed will be substantially the same composition as the particles in the fuel conversion bed, and will therefore contain only a minor proportion of alkaline earth metal sulfide. Thus, in the exothermic reactions in the regeneration bed, most of the material of the particles will serve as a heat sink and prevent excessively rapid temperature rises. Moreover, in the event that the regeneration bed should not regenerate the alkaline earth metal sulfide to oxide (for example, because the overall $O_2/CaS$ mol. ratio is high and the temperature relatively low so that most CaS is converted to $CaSO_4$, and most of the remaining CaS is unchanged), the sulfur-fixing activity of the fuel conversion bed will be substantially unaffected. Appropriate monitoring of the regeneration bed for temperature and concentrations of $SO_2$ and $O_2$ in the off-gas above the bed indicates the circumstances mentioned above, and appropriate corrections to the operation of the regeneration bed can be made without substantially adversely affecting the quality of the combustible gas leasing the top of the fuel conversion bed.

Preferably, the fuel conversion bed is operated at a temperature in the range 800° C. to 1100° C. In this range of temperatures, alkaline earth metal carbonates do not form in the conversion bed at atmospheric pressure operation from any $CO_2$ produced during the part-combustion of the fuel.

The alkaline earth metal oxide is preferably CaO, MgO or a mixture thereof. CaO is more preferred in view of its low cost and high effectiveness. A source of alkaline earth metal oxide is added to at least one of the beds as make-up to maintain the sulfur-reactivity of the conversion bed. Such a source may be limestone, dolomite, lime or any mixture of the foregoing. In order to maintain a substantially constant inventory of reactive particles in both beds, a bleed or discharge of solids from the regeneration bed is established substantially equal to the amount of added make-up particles.

The invention is now further described with reference to some non-limitative examples and with reference to the drawing which is a schematic diagrammatic vertical cross-section through apparatus for performing the integrated process of the invention.

The apparatus of the drawing comprises a first vessel 47 and a second vessel 48 which is of larger cross-sectional area than that of vessel 47. The two vessels may be spaced apart or may be formed, as shown, with a common wall 49. Near the base of the interior of vessel 47 is a distributor 61 for distributing a gas substantially uniformly into the bottom of the space above the distributor. Near the base of the interior of vessel 48 is a distributor 62 for distributing a gas substantially uniformly into the bottom of the space above the distributor 62. The distributors 61, 62 may be of any form known to those skilled in the art.

Immediately above, and (to some extent) supported on, each distributor 61,62 is a respective dense phase bed 50,60 of fluidized particulate solids, each bed having a distinct top surface 50a, 60a. The beds 50,60 are fluidized by passing into their bases from the respective distributors 61,62 an oxygen-containing gas, e.g. air. The air (or other oxygen-containing gas) is supplied from an air-supply fan or blower (not shown) of any type known in the art and via a conduit 56 and respective plenums 63,64 beneath each distributor 61,62. If necessary or desirable, the ratio of the amounts of air passing to the plena 63,64 may be regulated by a suitable valve disposed between the plena. As shown, a butterflytype valve 65 is disposed at the junction of the plena 63,64, but any other tpye of valve or throttling device may be employed instead.

The air passing upwardly from the distributors 61,62 through the respective beds 50,60 causes dense phase fluidization of the beds; that is to say, the particulate solids in the beds are slightly separated from each other by the passage of air and other gas phase components produced during operation such that the solids are relatively free to migrate in the beds up to the beds' top surfaces apart from collisions with each other and with the walls of the containing vessel, but not to any significant extent above the top surfaces of the beds 50,60. The free migration of the solids within each of the beds ensures that the compositions of solids at all regions of each bed are substantially the same.

The bed 60 is a fuel gasifying or conversion bed, and contains calcined dolomite particles (nominally CaO.MgO) at an operating temperature of from 860° to 900° C., e.g. about 880° C. A sulfur-containing fuel such as a heavy fuel oil, residuum, coal, lignite, or any combination of the foregoing, is passed into the bed 60 via a number of injectors 59, of which only one is shown in the drawing. The injector(s) 59 may be located to pass fuel into the bed 60 at any suitable depth. With fuels rich in volatile materials (e.g. liquid fuels, lignites and sub-bituminous coals, it is preferred to pass the fuel into bed 60 near the base to avoid losses of unconverted volatiles. The air to fuel ratio in the bed 60 is maintained at a suitable value to maintain a steady operating temperature in the bed 60 without an excessive amount of the fuel material remaining unconsumed in the bed 60. For most fuels, air supplied at a rate which is from 18 to 25%, preferably 20 to 22%, of the stoichiometric requirement for complete fuel combustion appears to be a suitable amount to maintain the bed temperature with substantially complete conversion of the fuel to combustible gases. At a temperature of about 880° C. ($\pm 20°$ C.), sulfur in the fuel reacts efficiently with CaO in the particles in the bed 60 to form CaS. It is important that the molar proportion of CaO to CaS be maintained at a high level since the greater the amount of CaO available to fix sulfur from the fuel by chemical reaction, the greater is the proportion of the sulfur fixed and retained in the bed 60, and the smaller the amount of sulfur (including components of sulfur) to be found in the combustible gases leaving the top surface 60a of the bed.

Preferably, at least 90 mol.% of the CaO in the particles of bed 60 is unreacted with sulfur, and is available for conversion to CaS, and more preferably about 94 mol. % CaO or more, is available for fixing sulfur.

The combustible gases leaving the top surface 60a of the bed 60 are substantially free of sulfur and contain only minor amounts of small size solids which are unavoidably entrained out of the bed 60. The entrainment of solids is undesirable since the solids need replacement in the bed, and usually are detrimental in the use of the combustible gas products. The amount of entrained solids can be maintained at a low level by any of the expedients known in the art such as employing bed solids which have a low content of "fines" and/or which are resistant to attrition. In addition, as is well-known in the art, a reduction in the upward velocity of the gas product reduces the amount of fines in the gas product. Such a velocity reduction may be achieved by ensuring that the horizontal cross-sectional area of at least part of the volume of freeboard space above the top surface 60a of the bed 60 is greater than the area of the top surface 60a of the bed. This configuration is not shown in the drawing but is well-known and well-understood by those skilled in the art.

The bed 50 is a regeneration bed wherein CaS formed in bed 60 is converted back to chemically-active CaO which can be employed again in bed 60 to fix further amounts of sulfur from the fuel. The reactions in the regeneration bed 50 are exothermic and the temperature of the regeneration bed is higher than that of the gasifying bed 60. For example, the regeneration bed may be operated at a temperature in the range of from 1050° C. to 1300° C., e.g. 1055° to 1155° C., preferably about 1100° ($\pm 35°$ C.). The temperature should not be so high that particles lose their chemical reactivity during their residence time in the bed 50, and account must be taken of the temperature-resistance or sensitivity of the particles being used.

A duct 52a (shown dotted) in wall 49 provides a path for particles to pass from a top region of the gasification bed 60 to a bottom region of the regeneration bed 50. A duct 52b (shown in solid line) which is horizontally spaced apart from duct 52a provides a path for the passage of particles from a top region of the regeneration bed 50 to a bottom region of the gasification bed 60. Each duct 52a, 52b preferably has a short horizontal section at its bottom exit end, and the required flow of solids through the ducts is promoted by passing small quantities of gas into the horizontal sections to prevent the solids packing to a nonflowable condition. The gas may be air or, more preferably (but not necessarily) insert, such as $N_2$, and is passed into the exit ends preferably in pulses from respective conduits 57a, 57b. The pulses of gas are controlled by valves operating in accordance with a predetermined programme such as is known and understood by those skilled in the art.

The amount of air passing into regeneration bed 50 is regulated to provide sufficient oxygen for the exothermic regeneration of CaS to CaO with the evolution of sulfur moieties (mainly $SO_2$) with efficient use of the oxygen provided and with the avoidance of temperatures which are so high that the chemical reactivity of the solids is reduced. For efficient use of the oxygen, the gases leaving the top surface 50a of the bed 50 should contain only a small proportion of the oxygen supplied to the base of the bed and a relatively high content of sulfur moieties (e.g. at least 6 vol. % $SO_2$, preferably a least 8 vol. % $SO_2$, more preferably 10 vol. % or higher). If the gases leaving bed 50 have a low content of oxygen and sulfur moieties, it is likely that the oxygen is not being used efficiently for regeneration, but is being taken up to convert CaS to $CaSO_4$. When this happens, the mol. ratio of $O_2$ to CaS is excessive for the bed temperature, and steps must be taken to (a) increase the bed temperature; (b) reduce the amount of $O_2$ entering the bed; (c) increase the CaS content of the bed. Expedient (b) is usually the most convenient step to adopt, since all that is involved is reducing the air flow into the bed 50: this may be achieved by appropriate movement of valve 65 in the embodiment of the drawing. If the air flow rate is throttled in this manner, the homogeneity of bed 50 is preferably ensured by passing into plenum 64 an amount of oxygen-free gas (e.g. flue gas obtained by burning the combustible gas produced in the bed 60) equivalent in volume to the reduction in the volume of air. The conduit for the supply of oxygen-free gas is not shown in the drawing. Expedient (a) may be achieved at least to some extent by reducing the rate at which particles pass from the cooler gasifying bed 60 to the regeneration bed 50 by reducing the frequency of gas pulses in conduit 57a. Expedient (c) can be achieved by increasing the rate of introduction of sulfur (in the fuel) into the gasifying bed 60 since the sulfur which is fixed in bed 60 as CaS appears in bed 50. An increase in the rate of fuel-sulfur input may be achieved by using a fuel having an increased sulfur content, or by injecting into bed 60 an increased amount of sulfur-containing fuel. Expedient (c) is less convenient than expedients (a) and (b) because it affects the quality and/or quantity of combustible gas leaving the top surface 60a of bed 60.

As previously mentioned, it is important to regulate the temperature of the regeneration bed 50 to avoid excessively high temperatures which reduce the chemical activity of the particles therein. The chemical activity is related, inter alia, to the porosity of the particles, and it is found that clacined dolomite tends to maintain its porosity at relatively elevated temperatures for relatively long residence times in the regenerator bed 50. However, some calcined limestones are as good as calcined domolite in this respect and are appreciably cheaper. Excessively high temperatures in the regenerator bed 50 are the result of excessively high reaction rates of CaS and $O_2$ in bed 50. High temperatures may be reduced by one or more of the following expedients: (a) increasing the rate of circulation of particles from the cooler gasifier bed 60, e.g. by increasing the rate of gas pulses in tube 57a; (b) reducing the amount of oxygen available for reaction in bed 50, e.g. by partially closing valve 65; (c) reducing the amount of CaS passed to bed 50 from bed 60 by reducing the rate of fuel injection into bed 60 (this latter expedient may not be convenient as the availability of combustible gas is affected) or by switching to a fuel having a lower sulfur content (this also may be inconvenient); (d) greatly increasing the amount of gas passing through bed 50 to remove heat-this is inefficient. Generally speaking, expedients (a) and (b) are the best and expedient (a) is particularly advantageous in that the heat produced in the regenerator bed 50 is at least partly transferred to the gasifier bed 60 where it serves to reduce even further the amount of fuel which must be consumed merely to maintain the temperature of bed 60. A further expedient for temperature control in both beds 50 and 60 is to remove heat by providing heat transfer coils 80a, 80b immersed in the beds and to circulate a heat transfer fluid (e.g. steam) through the coils to extract heat. It is preferred to avoid the use of such coils because they tend to upset the homogeneity of the beds by impeding particles circulations in the beds.

Particles circulate from the regeneration bed 50 to the gasifying bed 60 via duct 52b which extends from the top region of the bed 50 to the bottom region of the bed 60. The passage of particles through the duct 52b is assisted (if necessary) by gas injection, preferably pulsed, at the exit section of the duct 52b. The injected gas is preferably inert and supplied via tube 57b.

It will be appreciated that particles entering bed 60 are substantially at the temperature of regeneration bed 50 and therefore reduce the amount of fuel which must be consumed to maintain the temperature of the bed 50 for a given requirement of combustible gas of a specified quality. Moreover, the circulation of particles from the gasifier bed 60 to the regeneration bed 50 exerts a moderating effect on the temperature in the bed 50. Thus, so far as temperature management and enthalpy transfer are concerned, the two beds interact cooperatively with each other. The same cooperative interaction occurs with sulfur balances when the apparatus is correctly operated since an increase in the amount of sulfur fixed as CaS in bed 60 is relatively rapidly balanced by an increase in the amount of sulfur moieties in the gases leaving the top surface of regenerator bed 50. Moreover, because both beds are operated under dense phase fluidized conditions, both have a substantially homogeneous composition of solids which has the benefits that: (a) in the gasifier bed 60, sulfur which has become labile as a result of the fuel gasification reactions within the bed is surrounded by solids which provide an excess of active sites for fixing the sulfur by chemical reaction, and (b) in the regenerator bed 50, the sulfur-containing solids (containing e.g. CaS, $CaSO_4$) are circulated upwardly and downwardly repeatedly through lower zones of higher oxygen content and higher zones of lower oxygen content so that all the regeneration conditions tending to convert CaS to CaO either directly or indirectly (e.g. by localized heterogeneous reactions) take place, and the efficiency of regeneration is high as is also the utilization of the oxygen passed to the regenerator 47.

Over a period of time, the solids tend to lose their activity for fixing sulfur. In order to maintain the sulfur-fixing activity of the particles in the bed 60, a make-up of dolomite and/or limestone is added to bed 50 (where it is calcined) via line 70 (which may comprise a screw conveyor). An equivalent amount of solids is preferably dumped from bed 50 via line 71 (which may comprise a pneumatic and/or mechanical conveyor) to maintain the inventory of solids in the beds 50 and 60.

The substantially sulfur-free combustible gas leaving the top surface 60a of bed 60 may be passed through cyclones (not shown) to remove entrained solids and then burned in a gas-type burner of a boiler or utilized for chemical synthesis. Alternatively, the hot gas may pass, as shown, via a distributor 85 into the base of a fluidized bed 45 of particles (e.g. sand, optionally containing a small proportion of CaO, or dolomite and/or limestone). Air from conduit 56 is passed via a trunking 46 into bed 45 and the combustible gas is burned in the bed. The heat produced by the burning of the combustible gas is recovered in immersed heat recovery coils 86 through which a heat recovery fluid (e.g. steam and/or water) is circulated. The resulting combustion gases leaving the top of bed 45 are preferably de-dusted (by any known means), passed in contact with further heat recovery equipment (not shown) such as economizers and discharged to atmosphere at a relatively low temperature.

The gases leaving the top surface 50a of regenerator bed 50 may be de-dusted and then employed for the manufacture of, e.g. sulfuric acid. Alternatively, as shown, the gases pass upwardly through a distributor 87 into a bed 51 into which a small proportion of the combustible gas from gasifier bed 60 is passed via a number of ports 88 through wall 49. A throttle 89 is provided to regulate the flow of gas through the ports 88. In the bed 51, the sulfur moieties are reduced to sulfur, and the bed may contain catalysts (e.g. bauxite) to promote the reduction. The temperature of bed 51 is regulated by the passage of a temperature-control fluid through coils 90 immersed in the bed 51. The gas leaving the top of bed 51 is recovered in a header 91 and, under the influence of a circulation fan 54 circulated via a sulfur condenser 53 wherein sulfur is condensed and removed to a recirculation conduit 55 for recirculation to the gasifier bed 60 wherein any sulfur values not recovered as elemental sulfur in the condenser 53 are fixed as CaS. As the amount of gas passing through the regenerator bed 50 is small (e.g. about one sixtieth of that passing through the gasifier bed 60), the additional burden of gas thus recirculated to the gasifier bed 60 can be accommodated.

EXAMPLE

A particulate limestone (size range 600-3000 microns) was dumped in both beds 50 and 60 of an experimental apparatus to form a bed having a depth of 103 cms. A vacuum pipestill bottoms fuel was passed into the bed 60 from injector 59. The fuel had the following principal properties:

| Specific Gravity | 1.015 |
| --- | --- |
| Viscosity Cs at 210° F. | 3180 |
| Viscosity Cs at 350° F. | 240 |
| Viscosity Cs at 400° F. | 71 |
| % Composition by Weight | |
| C | 84.7 |
| H | 10.0 |
| S | 3.2 |
| N | 0.6 |
| Con. C. | 17.4 |
| Asphaltenes | 6.9 |
| V ppm | 580 |
| $N_1$ ppm | 66 |
| Na ppm | 6 |
| Fe | 3.5 |

The fuel was partially combusted within the bed 60 at a temperature of about 958° C. and with an air/fuel ratio of 30.8% stoichiometric. The rate of circulation of solids between the gasifier bed and the regenerator bed 50 was such that at equilibrium, the gasifier bed 60 had a sulfur content of 4.5 wt. %, and a calcium/sulfur mol. ratio of 2.05. An analysis of the combustible gas leaving the top of bed 60 showed that about 83% of the total sulfur supplied to bed 60 in the fuel was retained in bed 60. The temperature of the regenerator bed was 1075° C. and the gas leaving the top surface of the bed 50 contained no oxygen, a small content of $CO_2$ and 8.8 vol. % $SO_2$, the balance being inerts (mainly nitrogen). The rate of $SO_2$ evolution was 119.7% sulfur equivalent of the sulfur entering the bed 60 (i.e. the regeneration was proceeding at a faster rate than the rate at which sulfur was being fixed).

Taking account of the fact that the apparatus was an experimental one, not optimised for the particular fuel and operating conditions, the results obtained were excellent. It was also noted that much of the vanadium, nickel and sodium of the fuel was retained in the bed 60.

Similar experiments were performed using a variety of coals and lignites and virtually the same results were obtained.

What is claimed is:

1. An integrated process for converting a sulfur-containing fuel to a substantially sulfur-free combustible gas in which the fuel is partially combusted within a sulfur-fixing dense-phase fluidized fuel conversion bed operated at a fuel conversion temperature so that the fuel is converted to a substantially sulfur-free combustible gas which is discharged from above the top of the conversion bed and wherein sulfur from the fuel is fixed, by chemical reaction in particles of the conversion bed, and in which particles are transferred from a first region of the conversion bed to a first region of a dense phase fluidized regeneration bed operated at regeneration conditions including a regulated regeneration temperature exceeding the fuel conversion temperature so that at least some of the sulfur which is chemically fixed in the particles is released as gas phase sulfur moieties which are discharged from above the top of the said regeneration bed, and transferring particles from a second region of the regeneration bed, spaced-apart from the first region thereof, to a second region of the fuel conversion bed spaced apart from the first region thereof, wherein the conversion bed is comprised of particles including alkaline earth metal oxide which fixes sulfur from the fuel by forming alkaline earth metal sulfide, and the conversion bed is fluidized by passing into the bottom thereof an oxygen containing gas, and wherein the regeneration bed is fluidized by passing into the bottom thereof an oxygen containing gas whereby at least some alkaline earth metal sulfide from the fuel conversion bed is converted to alkaline earth metal oxide with the evolution of sulfur oxide(s) and the liberation of heat tending to raise the temperature of the regeneration bed towards a deactivating temperature range, regulating the rate of transfer of particles from the fuel conversion bed at the conversion bed temperature to the regeneration bed so as to effect at least partial regulation of the temperature in the regeneration bed in a range not exceeding a predetermined maximum regeneration bed temperature below the said deactivating temperature range, regulating the rate of supply of oxygen-containing gas to the regeneration bed to be such that:
   (a) sulfur is liberated therefrom as sulfur moieties, including sulfur oxide(s) at substantially the same rate as sulfur from the fuel is fixed in the fuel conversion bed; but
   (b) insufficient to reduce the temperature of the regeneration bed to that of the
   fuel conversion bed; and employing the heat content of the particles transferred from the second region of the regeneration bed to the second region of the fuel conversion bed to provide some of the heat required for maintaining the conversion temperature of the fuel conversion bed whereby a reduced amount of fuel is required to maintain the temperature of the fuel conversion bed and an increased proportion of the fuel is converted to substantially sulfur-free combustible gases.

2. A process as in claim 1 in which the transfer of particles from one bed to another is effected substantially independently of the rate at which oxygen-containing gas is passed into the bottom of a respective bed.

3. A process as in claim 1 in which the alkaline earth metal oxide is present in the fuel conversion bed in a stoichiometric excess relative to the amount of sulfur fixed in the bed from the fuel.

4. A process according to claim 3 in which the fuel conversion bed contains at least 90 mol % of the reactive alkaline earth metal as alkaline earth metal oxide and no more than 10 mol % as alkaline earth metal sulfide.

5. A process according to claim 1 in which the rate of transfer of particles from the fuel conversion bed to the regeneration bed is effected at a rate independent of the rate at which oxygen-containing gas is passed into the bottom of the conversion bed.

6. A process according to claim 1 in which the rate of transfer of particles from the regeneration bed to the fuel conversion bed is effected ar a rate independent of the rate at which oxygen-containing gas is passed into the bottom of the regeneration bed.

7. A process according to claim 1 in which the said alkaline earth metal oxide is selected from the group consisting of calcium oxide; magnesium oxide and mixtures thereof.

8. A process as in claim 1 in which a source of alkaline earth metal oxide is added as make-up to at least one of the beds to maintain the sulfur-fixing reactivity of the conversion bed, said source being in particles containing at least one of the following materials: limestone, dolomite, lime, a mixture of any two of the foregoing.

9. A process as in claim 8 in which the total inventory of reactive particles in both beds is maintained by discharging from the regeneration bed an amount of particles substantially equal to the amount of added make-up particles.

* * * * *